W. H. STOBIE.
APPARATUS FOR DISINTEGRATING FIBROUS MATERIAL.
APPLICATION FILED JAN. 23, 1913. RENEWED FEB. 19, 1915.
1,165,033.
Patented Dec. 21, 1915.
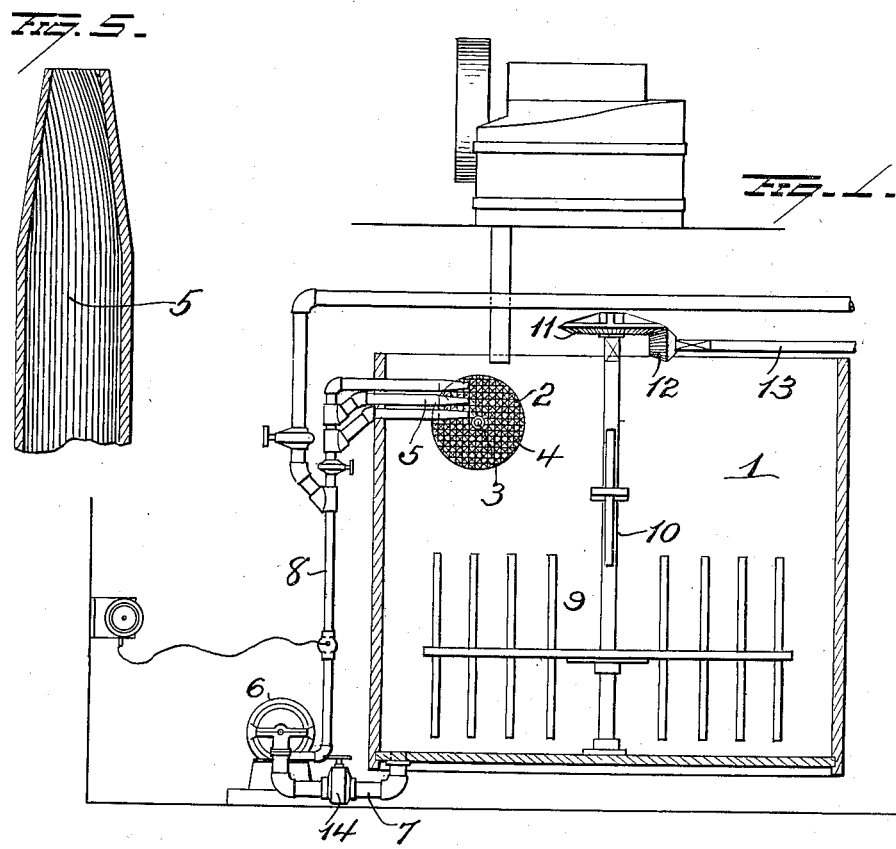
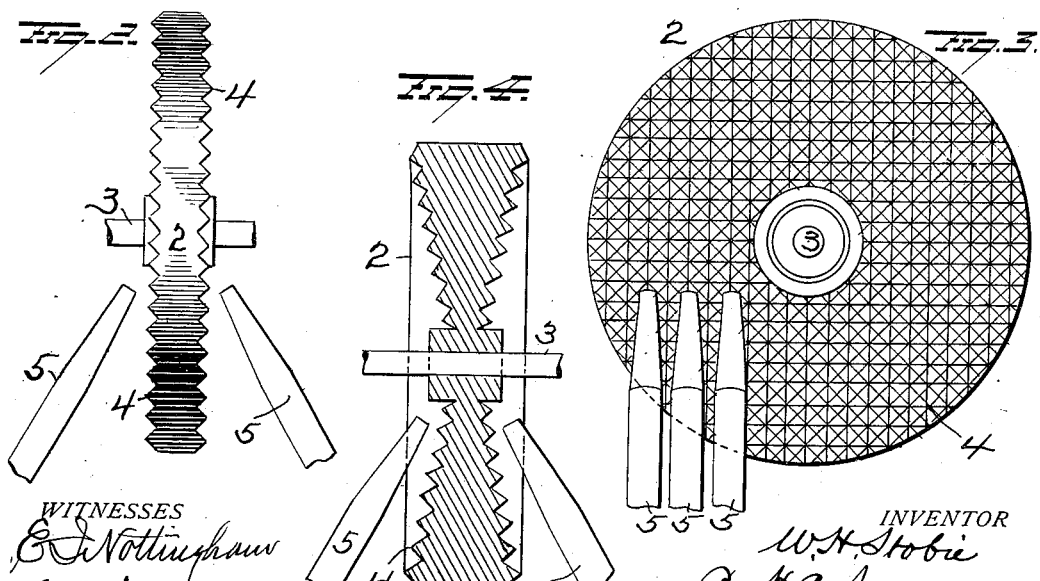

UNITED STATES PATENT OFFICE.

WILLIAM H. STOBIE, OF WATERVILLE, MAINE, ASSIGNOR TO HOLLINGSWORTH & WHITNEY COMPANY, OF BOSTON, MASSACHUSETTS, A CORPORATION OF MASSACHUSETTS.

APPARATUS FOR DISINTEGRATING FIBROUS MATERIAL.

1,165,033.      Specification of Letters Patent.      Patented Dec. 21, 1915.

Application filed January 23, 1913, Serial No. 743,872. Renewed February 19, 1915. Serial No. 9,463.

*To all whom it may concern:*

Be it known that I, WILLIAM H. STOBIE, of Waterville, in the county of Kennebec and State of Maine, have invented certain new and useful Improvements in Apparatus for Disintegrating Fibrous Material; and I do hereby declare the following to be a full, clear, and exact description of the invention, such as will enable others skilled in the art to which it appertains to make and use the same.

My invention relates to an improvement in apparatus for disintegrating fibrous material such as is used in the manufacture of paper pulp, the object being to provide simple and comparatively inexpensive means for disintegrating fibrous stock; and I have herein shown one illustrative embodiment of my invention, consisting in the parts, combination of parts, and details of construction hereinafter more fully described and pointed out in the claims.

In the accompanying drawings:—Figure 1 is a diagrammatic view of this illustrative embodiment of my invention; Figs. 2 and 3 are views respectively in plan and side elevation of one form of disk showing the coöperating nozzles; Fig. 4 is a view in section of a modified form of disk; and Fig. 5 is a view in section of one of the nozzles.

A vat or tank to contain the stock which may be mixed with the proper proportion of water to reduce it to a consistency where it can be readily pumped and conveyed through pipes is shown at 1, a disk mounted within the tank on a power driven shaft is shown at 2, the two faces of the disk being preferably serrated or provided with pointed projections 4 approximately pyramidal in shape, and covering approximately the entire surface area of both faces of the disk. I do not, however, wish to limit myself to this particular conditioning of the disk surfaces.

The disk is preferably made of metal and in a single piece, but it may be made up of sections if so desired, and is mounted on a shaft 3 which latter may be driven by power in a direction opposite to the movement of the streams from the nozzles. I have shown three nozzles 5 located at each side of the disk and tangentially to the face of the latter; but the number or precise positioning of the nozzles is immaterial. Some of the advantages of this arrangement are that as the disk 2 revolves it is continually presenting new surfaces to the impact of the streams, thus causing approximately equal wear over the surfaces of the disk, and this tends to keep the surfaces of the disk clear and prevents the accumulation of material at any one point. Again, by shutting off or throttling one or more of the nozzles 5, the pressure can, with the same pump capacity, be raised to a point where the stock will be more thoroughly conditioned, thus producing an effect previously attained only at a much greater cost.

Leading from the bottom of tank 1 to the pump 6 is the pipe 7 (provided with a throttle valve 14 by which the supply to the pump may be regulated), and leading from the tank to the nozzles 5, is the discharge pipe 8, the nozzles being located within the tank so that as the stock leaves the disk or target it will fall back into the tank; thus the operation may be repeated until the stock is in the desired condition to be passed to the next process of manufacture.

Located within the tank I have shown an agitator 9 secured to the vertical shaft 10, which is provided at its upper end with a bevel gear 11 meshing with the bevel pinion 12 secured to the driving shaft 13.

In Figs. 2 and 3 the faces of the disk are parallel, and in Fig. 4 the faces are concaved or saucer shaped. I prefer to rifle or groove the inner faces of the nozzles as shown in Fig. 5 so as to impart a rotary or spiral twist to the streams as they leave the nozzles, which movement of the fibers as they contact with the angular projections on the disk, causes rapid and thorough conditioning of the fibers.

With the arrangement as shown, the stock may be kept passing in a circuit through the pump and pipes, and is forced in rapid streams or jets against the projections on disk 2, and then drops back into the tank and so on until the stock has been reduced to proper consistency. Again, instead of repassing the stock through the vat and pump and against the disk until it has been reduced to the desired condition, I may, as a step in the process of paper making, project the stock against the disk and then pass it on to a reducing engine or other apparatus employed in the paper making process. The apparatus may also be used for improving the quality of certain grades of pulp before they enter some particular stage of manufacture.

A pulp mill selling pulp and not paper or other finished products, could, by the use of this apparatus, improve the grade and strength of its product. Some mills make only pulp and such mills employing this process could prepare the pulp for paper making, for example, without further treatment except to pass it through a beating engine for a few minutes to reduce the pulp from sheets back to the proper consistency for the paper machine, thereby saving at least fifty per cent. of the power required for the old system.

It is evident that many slight changes might be resorted to in the relative arrangement of parts shown and described without departing from the spirit and scope of my invention. Hence I would have it understood that I do not wish to confine myself to the exact construction and arrangement of parts shown and described.

I claim:

1. In apparatus for disintegrating fibrous paper stock the combination of a revolving disk having its opposed faces toothed or serrated, a pump and a nozzle for each serrated face of the disk, both said nozzles being coupled to the pump.

2. In apparatus for disintegrating paper stock, the combination of a revolving disk having a toothed or serrated face, and a pump and a nozzle arranged to discharge stock against said serrated face.

3. In apparatus for disintegrating fibrous material the combination of a revoluble disk having a conditioned fiber-detaining surface, and a pump and a nozzle arranged to project said material against said surface.

4. In apparatus for disintegrating paper stock the combination with a revolving disk having saucer shaped serrated faces approximately at right angles to the axis of the disk, of a pump and a nozzle for discharging the stock against each serrated face, the two nozzles being connected to the pump.

5. In apparatus for disintegrating fibrous material, the combination with a revoluble plate having a concave face, of a pump and a nozzle for discharging said material against said face.

6. In apparatus for disintegrating fibrous material, the combination of a revoluble body having concaved, roughened, fiber-detaining faces, a pump and means for discharging said material against said faces.

7. In apparatus for disintegrating fibrous paper stock, the combination of a target having a serrated face, a pump and a nozzle connected with the pump for discharging the stock against the said serrated surface, said nozzle having a rifled bore substantially as and for the purposes set forth.

8. In apparatus for disintegrating fibrous material the combination of a target, a pump and a nozzle connected with the pump for discharging said material against said target, said nozzle having a rifled bore substantially as and for the purposes set forth.

9. In apparatus for conditioning fibrous material the combination with a revoluble disk of a pump and a nozzle for discharging said material against said disk.

In testimony whereof, I have signed this specification in the presence of two subscribing witnesses.

WILLIAM H. STOBIE.

Witnesses:
  JOSEPH R. GOODWIN,
  HARVEY L. BURRILL.